United States Patent
Legner

(10) Patent No.: US 11,905,680 B2
(45) Date of Patent: *Feb. 20, 2024

(54) DRIVE FOR A MACHINE

(71) Applicant: ZF Friedrichshafen AG, Friedrichshafen (DE)

(72) Inventor: Juergen Legner, Friedrichshafen (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 806 days.

This patent is subject to a terminal disclaimer.

(21) Appl. No.: 16/977,834

(22) PCT Filed: Feb. 6, 2019

(86) PCT No.: PCT/EP2019/052822
§ 371 (c)(1),
(2) Date: Sep. 3, 2020

(87) PCT Pub. No.: WO2019/170344
PCT Pub. Date: Sep. 12, 2019

(65) Prior Publication Data
US 2021/0025137 A1    Jan. 28, 2021

(30) Foreign Application Priority Data

Mar. 9, 2018    (DE) .................... 10 2018 203 622.5

(51) Int. Cl.
*E02F 9/20* (2006.01)

(52) U.S. Cl.
CPC ............ *E02F 9/2095* (2013.01); *E02F 9/207* (2013.01)

(58) Field of Classification Search
CPC ................................ E02F 9/2095; E02F 9/207
See application file for complete search history.

(56) References Cited

U.S. PATENT DOCUMENTS

| | | | |
|---|---|---|---|
| 7,519,462 B2 | 4/2009 | Brown et al. | |
| 2014/0277884 A1 | 9/2014 | Zhou et al. | |
| 2015/0197239 A1 | 7/2015 | Vilar et al. | |

FOREIGN PATENT DOCUMENTS

| | | |
|---|---|---|
| DE | 102015111926 A1 | 1/2017 |
| EP | 3130708 A1 | 2/2017 |
| JP | 2006205777 A | 8/2006 |
| JP | 2006233843 A | 9/2006 |
| JP | 2008214970 A | 9/2008 |

*Primary Examiner* — Michael D Lang
(74) *Attorney, Agent, or Firm* — LEYDIG, VOIT & MAYER, LTD.

(57) ABSTRACT

A drive for a work machine includes a computer configured to control a first electric motor for driving vehicle wheels and a second electric motor for driving a work attachment. The computer is configured to process signals which correspond to control of a movement of a lifting mechanism of the work attachment or a bucket of the work attachment. The computer is further configured to process a signal which corresponds to a position of an accelerator pedal. The first electric motor and the second electric motor are configured to be controlled separately from each another, and control of the second electric motor takes place according to the control of the movement of the work attachment.

8 Claims, 5 Drawing Sheets

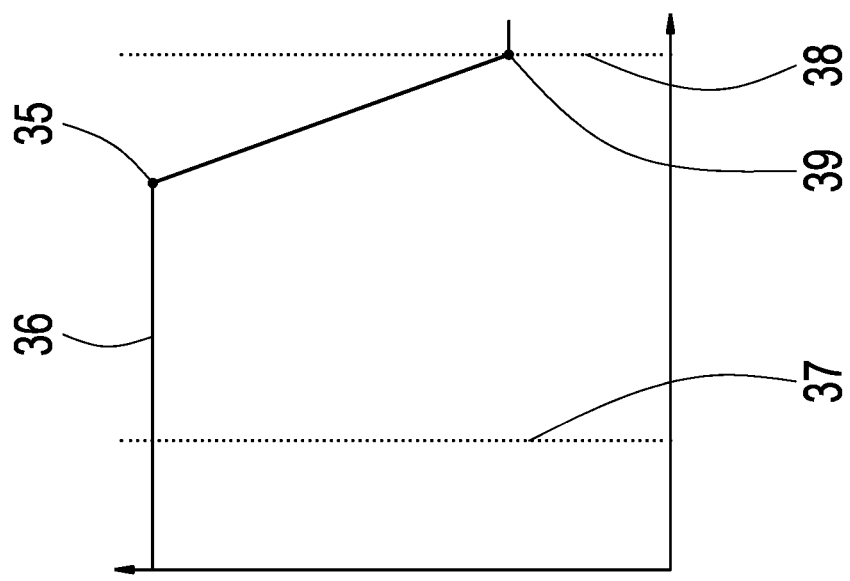
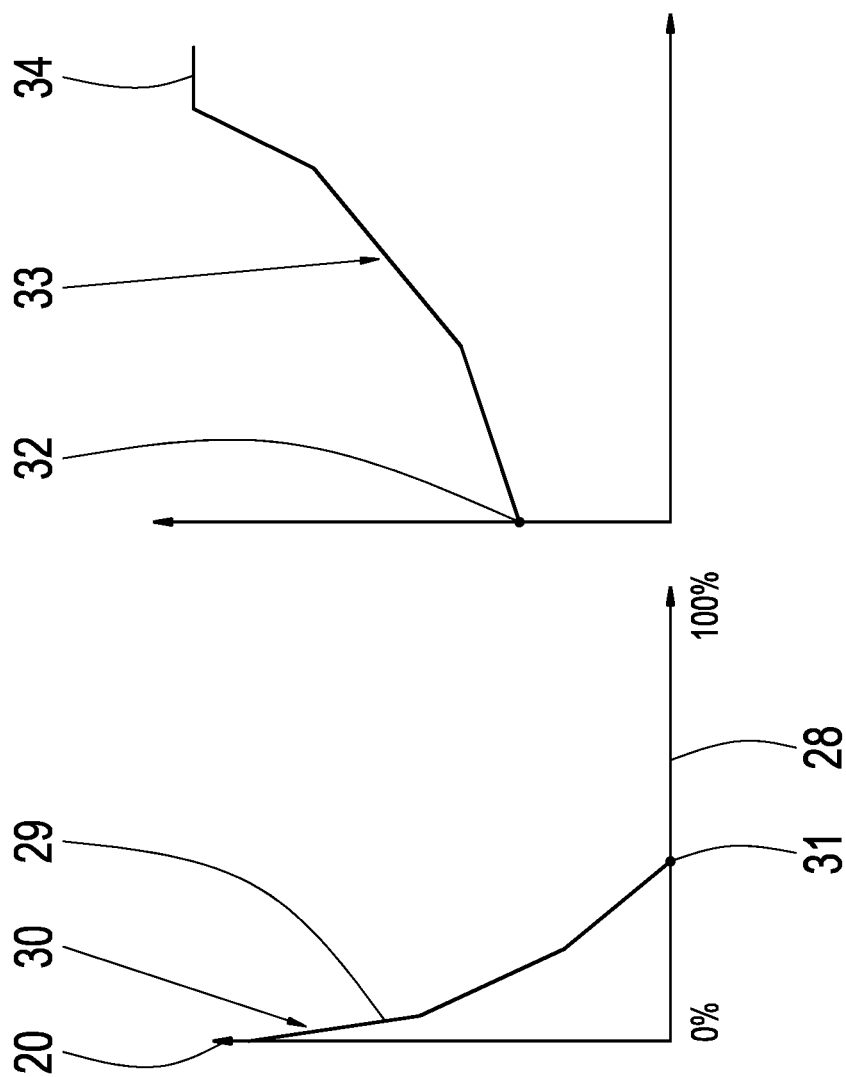
Fig. 7
Fig. 6
Fig. 5

DRIVE FOR A MACHINE

CROSS REFERENCE TO RELATED APPLICATIONS

This application is a U.S. National Stage Application under 35 U.S.C. § 371 of International Application No. PCT/EP2019/052822 filed on Feb. 6, 2019, and claims benefit to German Patent Application No. DE 10 2018 203 622.5 filed on Mar. 9, 2018. The International Application was published in German on Sep. 12, 2019 as WO 2019/170344 A1 under PCT Article 21(2).

FIELD

The invention relates to a drive for a work machine, such as a wheel loader.

BACKGROUND

Generic drives have an electric motor which drives the vehicle wheels.

US 2015/0197239 A1 and EP 31 30 708 A1 disclose a wheel loader with an electric motor for driving the vehicle wheels.

SUMMARY

In an embodiment, the present invention provides a drive for a work machine. The drive includes a computer configured to control a first electric motor for driving vehicle wheels and a second electric motor for driving a work attachment. The computer is configured to process signals which correspond to control of a movement of a lifting mechanism of the work attachment or a bucket of the work attachment. The computer is further configured to process a signal which corresponds to a position of an accelerator pedal. The first electric motor and the second electric motor are configured to be controlled separately from each another, and control of the second electric motor takes place according to the control of the movement of the work attachment.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 5 depicts a characteristic curve when the brake pedal is actuated;

FIG. 6 depicts a characteristic curve for controlling the rotational speed of the second electric motor;

FIG. 7 depicts a characteristic curve for controlling the second electric motor;

DETAILED DESCRIPTION

Figure 1:
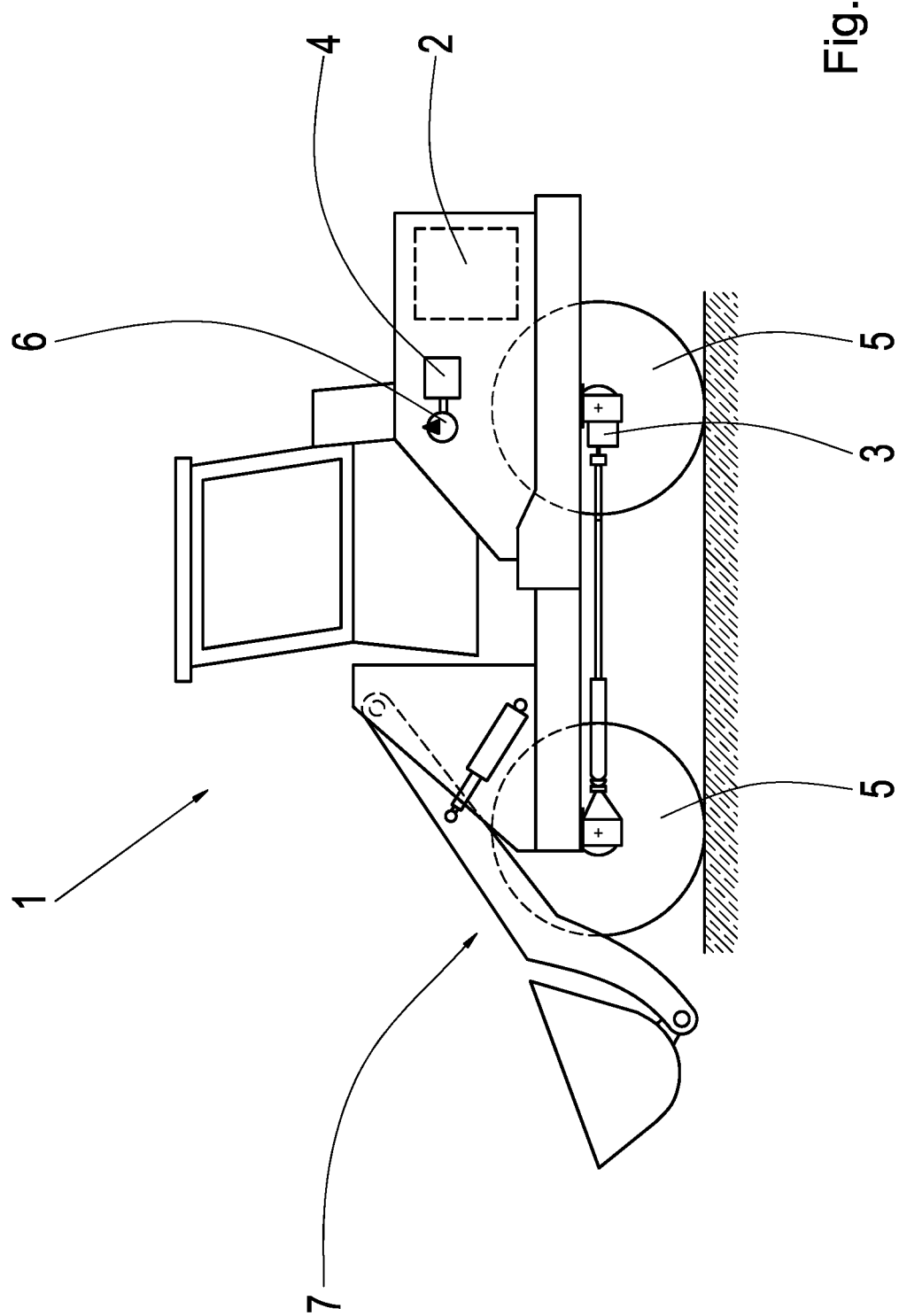
FIG. 1 depicts a wheel loader.

The present disclosure describes improvement for a drive for a work machine with an electric motor for driving the vehicle wheels.

A drive according to the present disclosure has a computing unit which can receive signals from an accelerator pedal and which controls a first electric motor for driving the vehicle wheels. Furthermore, the computing unit controls a further motor which is adapted for driving a work attachment, for example by driving a hydraulic pump. It is possible for this further motor to be a second electric motor. However, it is also possible for this further motor to be a motor of a different type. Hereinafter, however, only the term second electric motor is used for the sake of simplicity.

The first electric motor for driving the vehicle wheels and the second electric motor for driving the work attachment can be controlled separately from one another by means of the computing unit.

This makes it possible to control a work machine, such as a wheel loader, in such a way that it has similar driving behavior as today's diesel engine-driven wheel loaders. As a result, it is possible to use a purely electric work machine without the driver of a diesel engine-driven work machine having to readjust to it.

The work machine can draw energy from a battery. However, it is also possible for the work machine to have a fuel cell or other electrical energy sources, such as a connection to a grid by means of a cable. This makes it possible to operate the work machine purely electrically.

An accelerator pedal, which outputs a signal to the computing unit, is arranged in the driver's cab of the wheel loader. When the accelerator pedal is not actuated, it is possible to output a 0% signal; if the accelerator pedal is fully actuated, it is possible to output a 100% signal. Furthermore, a brake pedal is arranged to brake the vehicle. The brake pedal also outputs a signal to the computing unit. At the first pedal push or stroke of the brake pedal, the brake pedal outputs a signal to not brake the vehicle by means of the service brake yet but to activate a so-called inch mode instead. In inch mode, the power and thus also the rotational speed of the motor for driving the work attachment should be increased and the power and thus also the torque at the vehicle wheels should be reduced. Furthermore, the wheel loader has a multifunction lever by means of which operation of the work attachment, such as the lifting framework or lifting mechanism and the bucket, is enabled, the driving direction can be set, and a driving range, for example a fast driving range and a slow driving range, can be selected. The vehicle furthermore has a neutral switch and a parking brake actuator. The multifunction lever is preferably also connected to the computing unit.

In order to design the electric work machine to act like a diesel engine work machine, the first electric motor should be controllable as a function of the position signal of the accelerator pedal. For this purpose, the accelerator pedal has an analog sensor which detects the position of the accelerator pedal and is used to specify the rotational speed and torque of the first electric motor. A memory unit is provided in which a characteristic diagram with characteristic curves is stored, in which the torque of the first electric motor and the rotational speed of the first electric motor are stored for a plurality of pedal positions of the accelerator pedal. The characteristic curves are designed such that, when the first electric motor is idle, the torque changes as a function of the pedal position. This can be made possible, for example, in that the maximum torque corresponds to the maximally actuated accelerator pedal and no torque corresponds to a non-actuated accelerator pedal. The torque can now be assigned linearly to the change in the accelerator pedal by assigning each position of the accelerator pedal out of a plurality of positions of the accelerator pedal to one characteristic curve each.

It is thereby possible to allow the wheel loader to engage in a driving behavior in which, in order to fill the bucket, the wheel loader can be brought to its traction limit of its wheels by changing the position of the accelerator pedal.

It is also necessary for the characteristic curve to which an accelerator pedal position is assigned to have a defined maximum rotational speed which cannot be reached at any torque. It is thereby possible, by means of the accelerator pedal, to maintain the speed even when the vehicle is moving in a terrain in which the vehicle does not require any torque.

If the vehicle is in overrun mode, it is advantageous to specify a limited torque in order to reproduce a known coasting or braking behavior for the driver. Since the braking torque in today's internal combustion engine drives is significantly smaller than the drive torque, the drive and thus the first electric machine should be moved into overrun mode whenever the maximum rotational speed at torque 0 is exceeded for a corresponding pedal position of the accelerator pedal. The braking torque should then increase with increasing rotational speed on a gradient to a defined level and remain virtually constant even if the rotational speed increases further. The maximum braking torque is preferably specified independently of the pedal position of the accelerator pedal.

It is also possible to increase the braking torque for less pedal actuation of the accelerator pedal and to specify the braking torque to be lower for greater pedal actuation of the accelerator pedal.

If the vehicle has a selector switch for a fast driving range and a slow driving range, for example in the multifunction lever, the maximum rotational speed of the first electric motor in the fast driving range is only limited for a very high rotational speed, i.e., the technically reasonable maximum rotational speed. When the slow driving range is selected, the rotational speed is limited as a function of the position of the accelerator pedal much earlier. For this purpose, the accelerator pedal position of 0 to 100% is divided into a rotational speed range of the first electric motor, wherein the maximum rotational speed in the slow driving range may correspond, for example, to one third of the maximum rotational speed of the fast driving range.

In order to use the vehicle optimally in inch mode, the vehicle has a brake pedal next to the accelerator pedal. In inch mode, the power from the first electric motor is reduced and the power of the second electric motor is increased. For this purpose, the brake pedal can have an analog sensor which outputs a signal as a function of the position of the brake pedal. This signal is used to specify the reduction of the rotational speed and torque of the first electric motor for driving mode. In the first part of the brake pedal actuation, the service brake is not activated. In this part, the sensor signal is used for inch mode, i.e., to reduce the rotational speed and torque of the first electric motor and to increase the power of the second electric motor.

If the brake pedal is further depressed, the service brake is also actuated.

In a further embodiment, the second electric motor, which drives the actuation of the work attachment, is controlled as a function of the signal of the accelerator pedal. It is possible to control the second electric motor not only as a function of the accelerator pedal signal but also as a function of the rotational speed of the first electric motor. The work attachment can be, for example, the lifting and bucket movement, which can be activated with a multifunction lever.

It is possible for the second electric motor to drive hydraulic pumps, whose means of applying pressure act on cylinders of the work attachment. These hydraulic pumps can be designed as fixed displacement pumps, i.e., pumps with a fixed displacement volume, but it is also possible to use pumps with a variable displacement volume. When pumps with variable displacement volumes are used, load sensing control can be used. When pumps with a fixed displacement volume are used, the rotational speed of the second electric motor determines the delivery volume. The second electric motor should be controlled in such a way that, when the accelerator pedal is not actuated, the second electric motor has a minimum rotational speed, whereby a minimum volumetric flow can be delivered so that steering movements can still be executed even when the vehicle is at a standstill. The pump, which is connected to the second electric motor, conveys pressure medium to a steering valve, which applies pressure medium to actuators for steering.

When the accelerator pedal is actuated, a rotational speed specification for the first electric motor is output using a characteristic curve which is stored in a memory unit. The more the accelerator pedal is actuated, the higher the rotational speed of the first electric motor should be. The rotational speed of the second electric motor is limited as a function of the rotational speed of the first electric motor. If the rotational speed of the first electric motor is low, the second electric motor must be able to have a rotational speed up to the maximum rotational speed. If the rotational speed of the first electric motor is higher, the rotational speed of the second electric motor can be reduced since the vehicle has a higher speed in this case and thus the work attachment, for example the lifting or bucket hydraulics, need not be moved quickly. However, a minimum rotational speed must be maintained for steering the vehicle, which is why the rotational speed of the second electric motor may not drop below a minimum rotational speed. Limiting the rotational speed of the second electric motor improves efficiency.

Pumps with fixed delivery volumes driven by the second electric motor are preferably used for work machines with less power. Work machines with greater power use variable displacement pumps, which are preferably used in combination with a load sensing system. In the load sensing system, if there are multiple loads, the respectively highest load pressure and the pump pressure of a pressure position are used to adjust the pump. The pump always only delivers as much as the activated loads require in total. The pump pressure always corresponds to the highest load. If no load is activated, the pump delivers only the leakage oil flow.

In a further embodiment, this pump, whose displacement volume can be adjusted, has a sensor by means of which the current delivery volume of the pump can be detected. This signal is used to specify the rotational speed of the second electric motor. The sensor signal is calibrated and interpreted. The signal may take values between 0% and 100%. The rotational speed of the second electric motor can now be adapted to the corresponding demand as a function of the signal of the sensor. If no work function is actuated, for example if the cylinders of the lifting mechanism are not activated, the sensor signal of the variable displacement pump is almost 0. In this state, the rotational speed specification for the second electric motor is moved toward a lower limit value. If the load is now activated, for example the lifting mechanism is actuated, the load sensing system notifies the work pump of a delivery requirement and the work pump increases its delivery volume and the sensor signal rises. The term "work pump" is used here to denote the variable displacement pump which is connected to the second electric motor. If the available delivery volume of the work pump rises above what is needed, this is detected by a falling sensor signal of the work pump. A further increase in rotational speed is not expedient. The second electric motor is therefore controlled in such a way that it no longer increases its rotational speed. When the threshold value is undershot, the rotational speed specification for the second electric motor is reduced to the lower limit value via a control algorithm. The lower limit value is defined by a minimum volumetric flow, for example for steering. In order to stabilize the rotational speed specification for the second electric motor, a hysteresis exists between rising and falling sensor signals.

In addition, the change in the sensor signal over time can be used to specify the rotational speed of the second electric motor. A strongly rising or falling signal can affect the dynamics of the rotational speed specification.

In a further embodiment, sensors are located on the work attachment, for example the lifting mechanism and the bucket. It is also possible to detect actuation of the lifting mechanism or the bucket by means of one or more sensors in the multifunction lever by means of which the lifting mechanism can be controlled. The rotational speed of the second electric motor is adjusted to the demand as a function of actuation of the lifting mechanism.

The dependence of the rotational speed specification of the second electric motor on the accelerator pedal position and on the rotational speed of the first electric motor may remain. The sensor information, which detects actuation of the lifting mechanism and bucket of the work attachment, is superimposed on this dependence.

The sensors in the multifunction lever or in the lifting mechanism and the bucket generate a signal proportional to the actuation of the lifting mechanism and the bucket. These sensor signals are calibrated and interpreted. Both signals may take values between −100% and +100%. For the lifting movement, the sensor signal is calibrated to −100% for maximum lowering and +100% for maximum raising. For bucket movement, a sensor signal of −100% means a maximum tipping out of the bucket and +100% a maximum tipping in of the bucket. If the multifunction lever is not actuated, i.e., no lifting or bucket movement is requested, the sensors each supply a signal of 0%. The rotational speed specification for the second electric motor should use the larger of the two sensor signals in each case. If the signal from the sensors is 0%, the work function is not actuated, causing the rotational speed specification for the second electric motor to be moved toward a lower limit value. If the sensor now recognizes that the lifting mechanism is to be moved, the rotational speed of the second electric motor is increased as a function of the sensor signal.

In order to control the first electric motor and the second electric motor, the first electric motor and the second electric motor each have power electronics which can be arranged directly adjacent to the first electric motor and the second electric motor. It is also possible to arrange the power electronics at a different location. The power electronics of the first electric motor and the power electronics of the second electric motor are connected via a CAN bus system to a vehicle computer, also called a computing unit. It is possible to also connect a display via the CAN. The vehicle computer receives signals from a brake pedal, an accelerator pedal, a switch for the parking brake and a switch for the driving direction, a switch for the driving speed between a fast and a slow driving speed, and a switch for a neutral position. When variable work pumps connected to the second electric motor are used, the vehicle computer can also receive a signal from a sensor about the status of the displacement volume of the work pump.

Power is supplied via a battery. However, it is also possible to design the power supply via an internal combustion engine which drives a generator, and it is possible to supply the vehicle with power by means of a connection to a fixed power grid. A combination of these power supplies can also be present.

According to the operating strategy, the computing unit outputs setpoint values for the rotational speed and the maximum torque to the power electronics of the first electric motor and to the power electronics of the second electric motor. The power electronics themselves regulate the two electric motors according to the specifications. The actual values of the rotational speed and the torque as well as the operating states of the two electric motors are reported back to the computing unit. This makes it possible to use standard power electronics which have only enough computing power to operate the electric motors. The computing unit requires no additional outputs, only inputs and communication via the CAN. This is very cost-effective.

FIG. 1:

A wheel loader 1 has a battery 2 which provides the power for the first electric motor 3 and the second electric motor 4. The first electric motor 3 drives the vehicle wheels 5. It is possible to use a plurality of electric motors instead of a first electric motor 3. The second electric motor 4 drives a pump 6 which is also called a work pump and supplies the cylinders of the lifting mechanism 7 and the steering of the wheel loader 1 with a pressure medium. In the case of lower power vehicles, the pump 6 can be designed as a pump with a fixed displacement volume; in this case, a plurality of fixed displacement pumps can also be used. In the case of higher power vehicles, it is also possible to design the pump 6 as one or more pumps with a variable delivery volume. These pumps with a variable delivery volume are frequently designed as load sensing pumps.

FIG. 2:

The power from the battery 2 is supplied to the first electric motor 3 via the power electronics 8. The power from the battery 2 is supplied to the second electric motor 4 via the power electronics 9. The second electric motor 4 drives the pump 6 which is designed to be variable in its displacement volume. The first motor 3 drives vehicle wheels not shown. Actuators 11 of the work attachment or of the steering can be controlled via valves 10. In order to detect the current displacement volume of the pump 6, a sensor 12 is connected to the pump 6.

The battery 2, the power electronics 8, the power electronics 9, the sensor 12, and a display 14 on which the driving direction, the speed, the driving range, and other vehicle states are displayed are connected to a computing unit 15, also called a vehicle computer, by wires 13, for example by means of a CAN. The computing unit 15 receives signals from a sensor of the brake pedal 16, a sensor of the accelerator pedal 17, a switch for the parking brake 18, and a plurality of switches and/or sensors in a multifunction lever 19, by means of which the speed driving range, a neutral function, and further functions, such as actuation of the actuators 11 of the work attachment, for example the bucket or the lifting mechanism, can be controlled. It is possible to design the functions of the multi-function lever 19 to be in one lever. However, it is also possible to design the individual sensors and switches to be in a plurality of switches and levers.

For example, if the accelerator pedal 17 is actuated, the computing unit 15 generates a signal for the first electric motor 3. The computing unit 15 also contains a memory unit, within which the characteristic curves, which are described in the further figures, are stored. Based on the signals received by the computing unit 15 and the stored characteristic curves, the computing unit 15 calculates a preliminary signal which the computing unit 15 outputs via the wire 13. This makes it possible to design the power electronics 8 and the power electronics 9 in such a way that they only have to be able to drive the first electric motor 3 and the second electric motor 4.

When the pump 6 is used as a load sensing pump, it is possible to determine the displacement of the displacement volume of the pump 6 by means of a sensor.

In a load sensing system, if there are multiple loads, the respectively highest load pressure and the pump pressure of a pressure compensator are used to displace the pump. The pump always only delivers as much as the activated loads require in total. The pump pressure always corresponds to the highest load. If no load is activated, the pump 6 delivers only the leakage oil flow.

With the sensor at the displacement of the pump 6, the current delivery volume of the pump can be detected. This signal is now used to specify the rotational speed of the second electric motor 3. The sensor signal is calibrated and interpreted. The signal may take values between 0% and 100%. Through the use of this sensor at the displacement of the pump 6, the rotational speed of the second electric motor 4 and thus the rotational speed of the pump 6 can be adapted according to the demand and thus designed more efficiently.

If the work attachment 11 is not actuated, the sensor signal of the displacement of the pump 6 is almost 0%. In this state, the rotational speed specification for the second electric motor 4 is moved toward a lower limit value. If a load, i.e., the work attachment 11, is now activated, the load sensing system of the pump 6 reports a delivery demand and the pump 6 increases its delivery volume and the sensor signal rises. For the rotational speed specification of the second electric motor 4, a threshold value for the sensor signal is defined at which the pump 6 is almost completely swiveled out, for example 95%. If this threshold value is exceeded, this is interpreted as insufficient delivery volume and the rotational speed specification for the working drive is therefore increased to the maximum value.

If the available delivery volume rises above the amount required, this is detected by a falling sensor signal of the work pump. A further increase in rotational speed is not expedient. When the threshold value is undershot, the rotational speed specification for the second electric motor 4 is reduced to the lower limit value by a control algorithm.

In addition, hysteresis is used to stabilize the rotational speed specification by this threshold value.

It is also possible to use the change in the sensor signal over time to specify the rotational speed of the second electric motor 4. A strongly rising or falling signal can affect the dynamics of the rotational speed specification.

Figure 2:
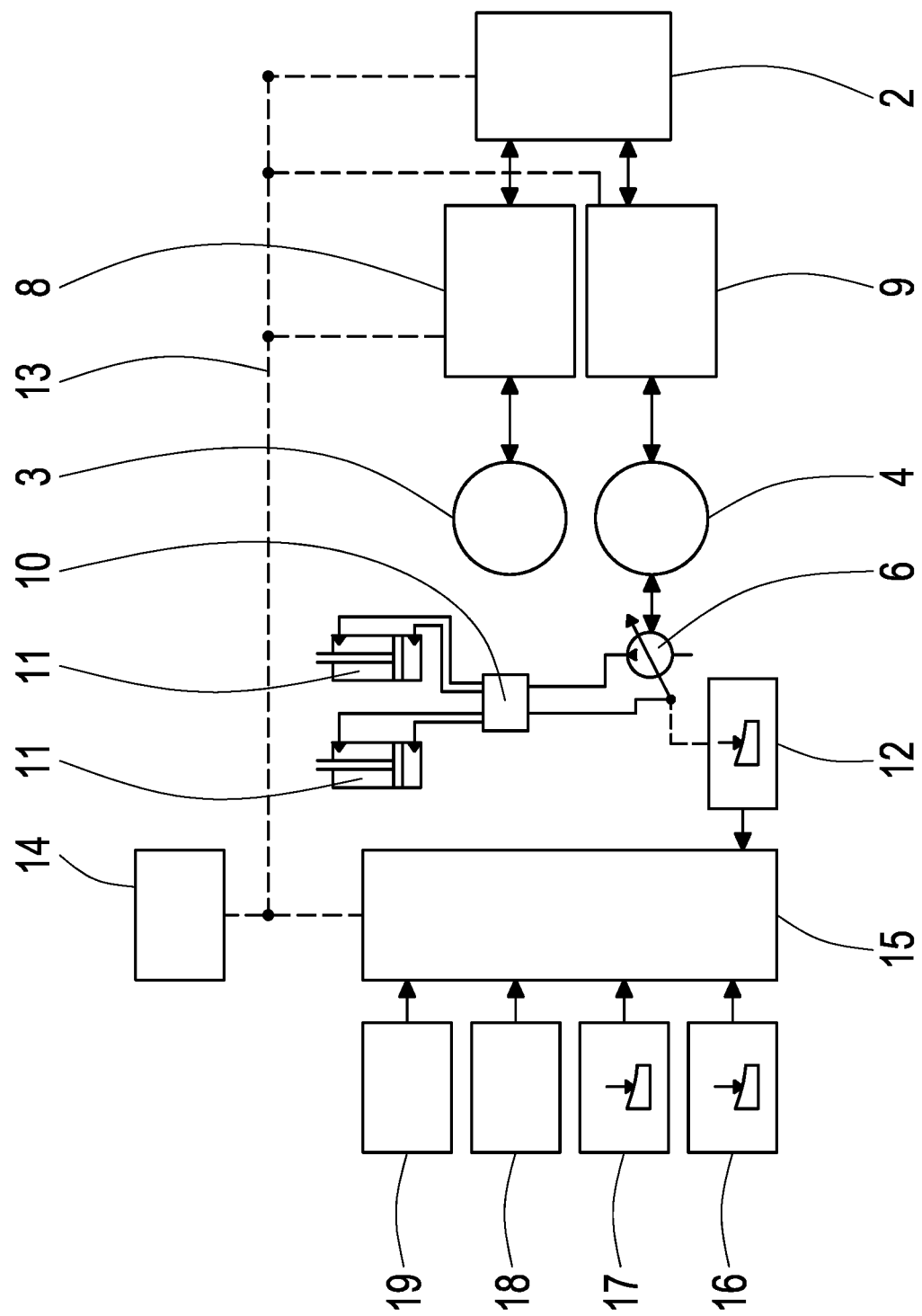
FIG. 2 depicts a diagram of the drive of the wheel loader.
Figure 3:
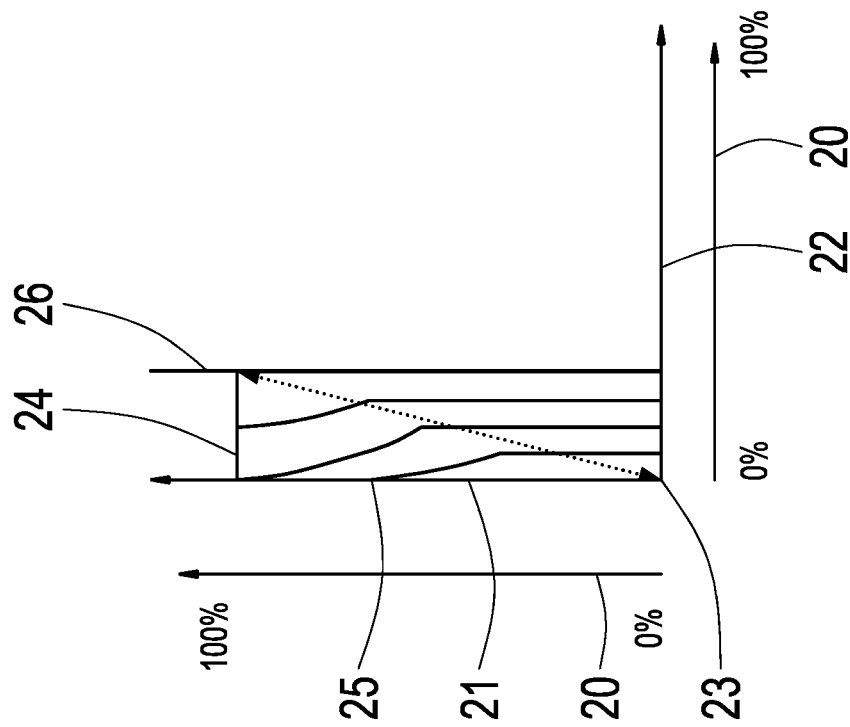
FIG. 3 depicts a characteristic diagram for controlling the first electric motor for a fast driving range.

FIG. 3:

The computing unit 15 of FIG. 2 stores characteristic curves which represent a fast driving range and a slow driving range. The diagram shown in FIG. 3 represents the fast driving range. In order for the driver of the wheel loader to control the torque at the vehicle wheels when the vehicle is at a standstill after driving into the heap until the vehicle is at a standstill, it is necessary to limit the torque of the first electric motor as a function of the position of the accelerator pedal. This makes it possible to generate a defined torque at the vehicle wheels for any position of the accelerator pedal when the vehicle is at a standstill, as a result of which the driver can control the vehicle as far as the traction limit via the accelerator pedal. For this purpose, the position of the accelerator pedal is determined by means of a sensor, wherein when the accelerator pedal is not actuated, the sensor outputs a signal which corresponds to the accelerator pedal signal 20 of 0%, and when the accelerator pedal is fully actuated, the sensor outputs a signal which corresponds to the accelerator pedal signal 20 of 100%. The characteristic curves of FIG. 3 are shown in a Cartesian coordinate system, wherein the ordinate represents the torque 21 of the first electric motor and the abscissa represents the rotational speed 22 of the first electric motor. Intersection points 25 which are assigned to a defined pedal position of the accelerator pedal are generated by intersection points of individual characteristic curves which can, for example, be evenly distributed, in one case for the rotational speed 0 from torque 0 23 to the maximum torque 24 over the accelerator pedal signal 20=100%. For example, it is possible to generate these intersection points using a certain number of characteristic curves, for example 0%, 25%, 50%, 75%, and 100%. The linear distribution is only exemplary; it is also possible to generate a non-linear distribution. The intermediate values between the characteristic curves are subsequently interpolated. It is thus possible to generate a torque at the vehicle wheels when the vehicle is at a standstill for each accelerator pedal position. The same procedure is carried out for the rotational speed 22 of the first electric motor, as a result of which intersection points with the abscissa at 0 torque are likewise generated. So that the vehicle does not exceed the maximum permissible speed, the rotational speed 22 of the first electric motor is limited to a maximum rotational speed 26. This makes it possible to control the speed of the vehicle by means of the accelerator pedal at very low or no torque. The diagram is then created in such a way that the maximum possible power is first plotted as a function of the accelerator pedal position. The maximum power is shown by line 27. In the further lines, the intersection points of the ordinate are connected to the intersection points of the abscissa.

The illustrated diagram shows only one quadrant of possible operation of the first electric motor. In this quadrant, the traction range and the direction of rotation are shown as forward. A similar or mirrored characteristic curve may also be used in reverse in the opposite direction of rotation. In overrun mode, a limited torque is advantageously specified in order to represent a typical coasting behavior or braking behavior. In today's internal combustion engine drives, the braking torque is significantly smaller than the drive torque. The drive should always enter overrun mode only if the intersection point of the rotational speed at 0 torque and corresponding pedal position is exceeded. The generated braking torque should then increase with increasing rotational speed on a gradient to a defined level and remain virtually constant even if the rotational speed increases further. The maximum braking torque can be specified to be constant and independent of the pedal position or specified to be higher for light pedal actuation and lower for strong pedal actuation.

It is possible to design the vehicle to have only one driving range, wherein the diagram is then used for the fast driving range. If an additional slow driving range is used, an additional diagram corresponding to FIG. 4 is generated.

Figure 4:
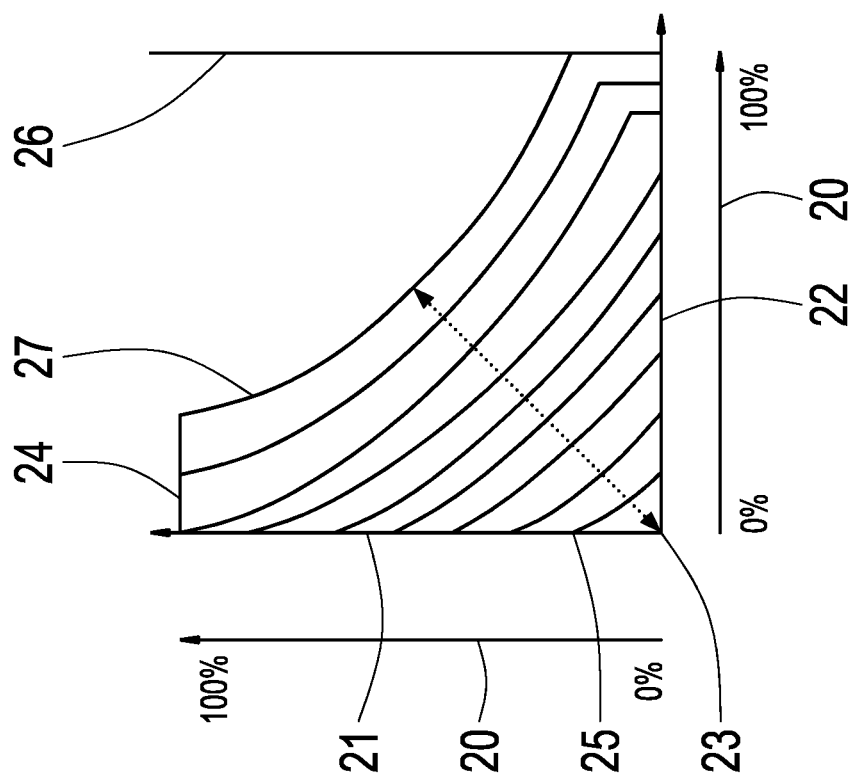
FIG. 4 depicts a characteristic diagram for controlling the first electric motor for a slow driving range.

FIG. 4:

The slow driving range shown in FIG. 4 is required for positioning maneuvers, for example working with a loading fork, with a fine accelerator pedal resolution. The term "fine accelerator pedal resolution" here means that in the slow driving range, the final speed is reached only when the accelerator pedal is fully actuated and not, as in the fast driving range, already in the first third of actuation of the accelerator pedal. The intersection points 25 of the maximum torque at rotational speed 0 in each case are identical to the intersection points 25 of the fast driving range of FIG. 3. However, the maximum rotational speed 26 is significantly reduced compared to the maximum rotational speed 26 in FIG. 3. However, the maximum rotational speed 26 in FIG. 4 is achieved only at 100% of the accelerator pedal signal 20. The intersection points of each maximum rotational speed of the first traction motor are thereby scaled to smaller rotational speeds at torque 0.

FIG. 5:

So that an inch function can also be represented, the brake pedal signal is processed in addition to the accelerator pedal signal. This makes it possible to operate the vehicle in inch mode, i.e., to reduce the power and thus the torque and rotational speed of the first electric motor and to increase the power and thus the rotational speed and torque for the second electric motor and thus the pump 6 of FIG. 2 for the work attachment, hence the steering and/or lifting and rotating of the bucket. For this purpose, the brake pedal position is detected via a sensor, preferably an analog sensor, and used as a specification for reducing the rotational speed and the torque, thus the power of the first electric motor for the traction drive.

For this purpose, the ordinate of FIG. 5 shows the current value of the signal 20 of the accelerator pedal between 0 and 100% and the abscissa shows the signal of the brake pedal 28 from 0 to 100%. If the brake pedal is not actuated, the accelerator pedal signal is not reduced. When the accelerator pedal is fully depressed, i.e., at 100%, and the brake pedal is not actuated, the signal of the accelerator pedal 20 therefore remains the same. The more the brake pedal is actuated, the more the signal of the accelerator pedal is reduced. In the first part 29 of brake actuation, the service brake is not activated, but the power to the first electric motor is reduced by reducing the accelerator pedal signal using the characteristic curve 30 and thus controlling the first electric motor with a lower target signal. The rotational speed specification for the first electric motor is thus reduced more and more as the accelerator pedal remains at a constant position and the brake pedal is being increasingly depressed. The characteristic curve 30 is designed in such a way that when the accelerator pedal is fully depressed, the accelerator pedal signal already drops sharply if the brake pedal is only slightly depressed. If the accelerator pedal is only lightly actuated, the brake pedal has to be depressed very far in order to achieve a reduction in the accelerator pedal signal. The service brake is additionally activated starting from a previously defined actuation path of the accelerator pedal. At point 31, the characteristic curve 30 intersects the abscissa, which means that the accelerator pedal is not actuated, wherein this point 31 either coincides with the actuation path through which the service brake is actuated or is selected shortly after this actuation path of the brake pedal in order to ensure a corresponding overlap. Because the accelerator pedal signal is reduced accordingly through the characteristic curve 30 as a function of actuation of the brake pedal, the control of the first electric motor with respect to its rotational speed and its torque changes as a result.

FIG. 6:

However, in order to change the control of not only the first electric motor as a function of actuation of the brake pedal, it is necessary to also control the second electric motor. For this purpose, the vehicle has a multifunction lever in the driver's cab, by means of which the work attachment, for example the lifting and bucket movement, can be controlled. The characteristic curve shown in FIG. 6 is used for the second electric motor with one or more pumps with a fixed displacement volume. In this embodiment, the delivery volume is determined solely by the rotational speed of the second electric motor. If a plurality of pumps is used, one pump can be provided for articulated steering of the wheel loader and a second pump for the work attachment, for example. Through control of the rotational speed of the second electric motor, the direct control of the second electric motor allows the delivery volume to be adapted to the required work situation. In conventional wheel loaders with an internal combustion engine, the pump is directly connected to the internal combustion engine, as a result of which free control of the pump is not possible.

The rotational speed of the second electric motor should be controlled as a function of the accelerator pedal signal and as a function of the rotational speed of the first electric motor. The ordinate in FIG. 6 therefore shows the rotational speed of the second electric motor and the abscissa shows the actuation of the accelerator pedal or the accelerator pedal signal. At point 32, the accelerator pedal is not actuated, as a result of which the vehicle is at a standstill. However, since steering movements must be possible in this standstill, the second electric motor is controlled at a minimum rotational speed as can be seen in point 32. As the accelerator pedal signal increases, the rotational speed specification for the second electric motor is increased along the characteristic curve 33 up to the maximum rotational speed 34. A second dependence on the rotational speed of the first electric motor is used to limit the maximum rotational speed 34 of the second electric motor. If the first electric motor is at a low rotational speed, meaning that the vehicle is moving at a low speed, the rotational speed of the first electric motor must be allowed up to the maximum rotational speed. At a higher rotational speed of the first electric motor and thus higher vehicle driving speed, it is possible to reduce the rotational speed of the second electric motor. This is due to the fact that the hydraulics for the bucket and the lifting mechanism do not have to be moved quickly at higher driving speeds. However, it is essential that a minimum rotational speed is maintained for steering. By lowering the rotational speed of the second electric motor as a function of the rotational speed of the first electric motor and thus as a function of the driving speed, the efficiency of the system is increased. The lowering of the rotational speed of the second electric motor as a function of the rotational speed of the first electric motor is shown in FIG. 7.

FIG. 7:

The rotational speed of the second electric motor is plotted on the ordinate and the rotational speed of the first electric motor is plotted on the abscissa. Up to point 35, the vehicle is still at low driving speeds and the maximum possible rotational speed of the second electric motor, which is represented by characteristic curve 36, is not reduced. Line 37 shows the maximum rotational speed of the first electric motor or the maximum driving speed in the slow driving range, and line 38 shows the maximum possible rotational speed of the first electric motor or the maximum driving speed of the vehicle in the fast driving range. The rotational speed of the second electric motor is reduced to point 39 in order to ensure a sufficient delivery volume for the steering.

Figure 8:
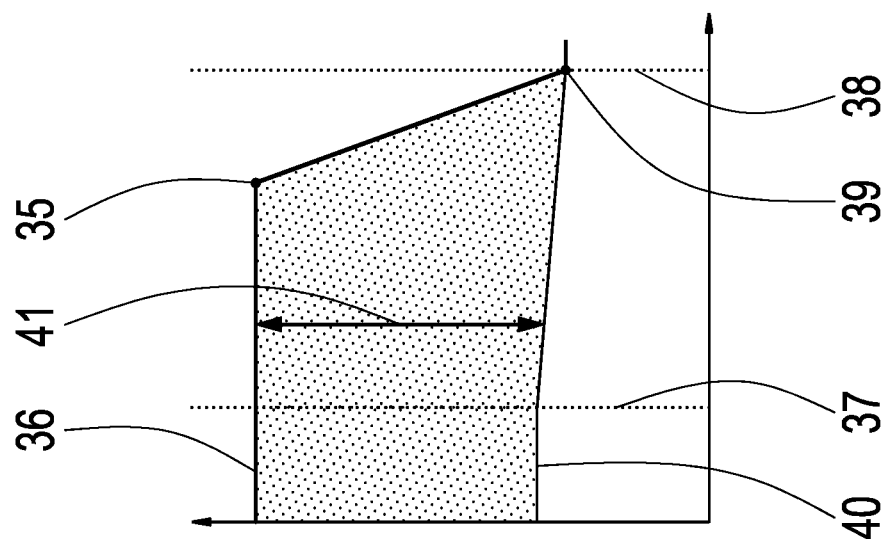
FIG. 8 depicts a characteristic curve for controlling the second electric motor.

FIG. 8:

If additional sensors are used either directly on the lifting mechanism or on the bucket or on the multifunction lever, by means of which the lifting mechanism and the bucket can be controlled, the rotational speed of the second electric motor can be adjusted further according to the demand. The dependencies of the rotational speed specification for the second electric motor on the accelerator pedal position and on the rotational speed of the first electric motor remain. In addition, however, information from the sensors is used for actuating the lifting mechanism and the bucket. These sensors supply a signal which corresponds to actuation and which may, for example, be a proportional signal. These sensor signals are calibrated and interpreted. Both signals can assume values of −100% to +100%, wherein for the lifting movement, the sensor signal can be calibrated, for example, to −100% for maximum lowering and to 100% for maximum lifting of the lifting movement. For bucket movement, a sensor signal of −100% means a maximum tipping out of the bucket and a sensor signal of +100% means a maximum tipping in of the bucket. If the multifunction lever is not actuated, i.e., no movement of the work attachment or of the lifting mechanism and bucket is requested, the sensors each supply a signal of 0%. The largest magnitude of the two sensor signals should be used to specify the rotational speed of the second electric motor in each case. FIG. 8 shows the dependence of the rotational speed specification for the second electric motor on the rotational speed of the first electric motor and the signal from the sensors of the work attachment. The rotational speed of the second electric motor is plotted on the ordinate and the rotational speed of the first electric motor is plotted on the abscissa. Line 40 shows an increase in the rotational speed of the second electric motor with simultaneous reduction of the rotational speed of the first electric motor. Line 37 is the maximum achievable rotational speed of the first electric motor in the slow driving range and line 38 is the maximum achievable rotational speed of the first electric motor in the fast driving range. The characteristic curve 36 with points 35 and 39 corresponds to the characteristic curve 36 in FIG. 7. This rotational speed is now reduced to line 40 depending on the sensor signal from the lifting equipment. This is indicated by the arrow 41.

Figure 9:
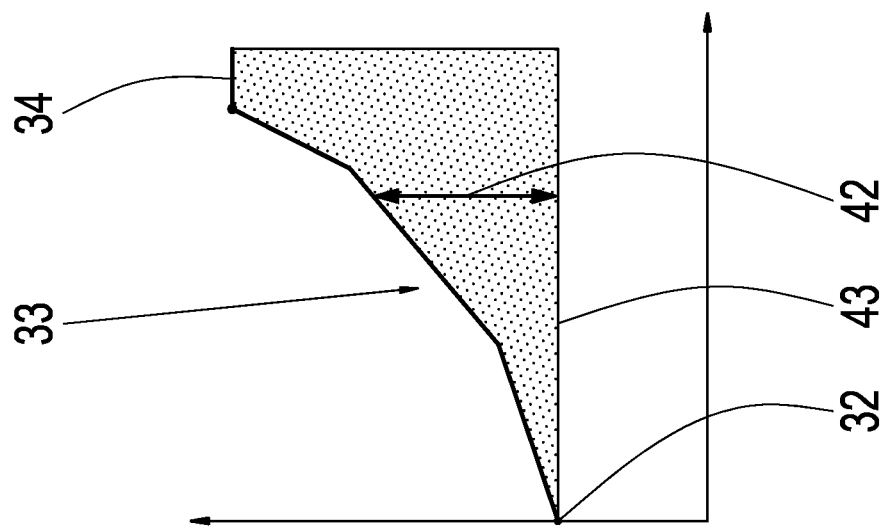
FIG. 9 depicts a characteristic curve for controlling the second electric motor as a function of the signal from the accelerator pedal and the multifunction lever.

FIG. 9:

FIG. 9 shows the reduction in the rotational speed of the second electric motor as a function of the sensors of the work attachment as described in FIG. 7. Here, the diagram corresponds to the diagram in FIG. 6 and the arrow 42 indicates that the rotational speed of the second electric motor is reduced as a function of the signals from the sensors of the work attachment. It is only possible to reduce the rotational speed of the second electric motor down to line 43.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 Wheel loader
2 Battery
3 First electric motor
4 Second electric motor
5 Vehicle wheels
6 Pump
7 Lifting mechanism
8 Power electronics
9 Power electronics
10 Valves
11 Actuators
12 Sensor
13 Wire
14 Display
15 Computing unit
16 Brake pedal
17 Accelerator pedal
18 Parking brake
19 Multifunction lever
20 Accelerator pedal signal
21 Torque
22 Rotational speed
23 Torque 0
24 Maximum torque
25 Intersection point
26 Maximum rotational speed
27 Line
28 Brake pedal signal
29 First part
30 Characteristic curve
31 Point
32 Point
33 Characteristic curve
34 Maximum rotational speed
35 Point
36 Characteristic curve 37 Characteristic curve
38 Line
39 Point
40 Line
41 Arrow
42 Arrow
43 Line

The invention claimed is:

1. A drive for a work machine, the drive comprising:
a computer configured to control a first electric motor for driving vehicle wheels and a second electric motor for driving a work attachment,
wherein the computer is configured to process signals which correspond to control of a movement of a lifting mechanism of the work attachment or a bucket of the work attachment,
wherein the computer is further configured to process a signal which corresponds to a position of an accelerator pedal,
wherein the first electric motor and the second electric motor are configured to be controlled separately from each another, and
wherein control of the second electric motor takes place according to the control of the movement of the work attachment.

2. The drive according to claim 1, wherein the first electric motor is controlled as a function of the signal of the accelerator pedal and as a function of a signal of the control of the work attachment.

3. The drive according to claim 1, wherein the second electric motor is controlled as a function of the signal of the accelerator pedal and as a function of a rotational speed of the first electric motor.

4. The drive according to claim 1, wherein a rotational speed of the second electric motor does not drop below a previously defined minimum rotational speed even in case of a signal which indicates no movement of the work attachment.

5. The drive according to claim 1, wherein a multifunction lever has sensors which generate a signal for controlling the work attachment.

6. The drive according to claim 1, wherein the work attachment or actuators of the work attachment have sensors configured to generate a signal for controlling the work attachment.

7. A wheel loader having a drive according to claim 1.

8. A method for controlling a power of a second electric motor for driving a work attachment of a wheel loader, the method comprising:
specifying a rotational speed for the second electric motor as a function of a rotational speed of a first electric motor configured to drive vehicle wheels and as a function of a signal for controlling the work attachment.

* * * * *